Patented Apr. 26, 1949

2,468,204

UNITED STATES PATENT OFFICE 2,468,204

STILBENE AZO DYES

Ernst Keller, Basel, Switzerland, assignor to J. R. Geigy A. G., Basel, Switzerland, a Swiss firm No Drawing. Application January 27, 1947, Serial No. 724,709. In Switzerland December 22, 1942

6 Claims. (Cl. 260—143)

This patent application is a continuation-in-part application of my copending patent application Ser. No. 506,759 filed on October 18, 1943 (now abandoned).

The main object of the present patent application consists in the production of metallisable brown stilbene dyestuffs and more particularly in the production of condensation products obtainable by interaction of nitrostilbene azo dyestuffs and metallisable aminoazo dyestuffs of the benzene series.

Apart from the vat dyestuffs sufficing to the utmost requirements, the substantive polyazo dyestuffs which can be stabilised on cellulosic fibres by a treatment with heavy metal salts, thus producing fast dyeings to light and in the moist state, recently have encountered an increasing importance because of their low costs and simple manner of handling and this in spite of the poor fastness properties of such substantive polyazo dyestuffs.

The present invention enables the production of substantive polyazo dyestuffs of the stilbene series and more particularly also of metallised dyestuffs of the stilbene series which are capable of being once more metallised on the fibres, whereby the same can be stabilised, thus giving brown shades of good general fastness properties and more particularly of excellent light- and water-fastness properties.

A further advantage of the new dyestuffs will be described in the following: Most of the metallisable substantive azo dyestuffs show on metallisation an important change of shade, thus rendering it extremely difficult for the dyer to produce dyeings of the same shade and of the same strength. Especially the dyeing of a material on the base of a determined shade of a pattern causes considerable difficulties. Thus for instance the dyestuffs disclosed in U. S. Patent 2,276,202 and 2,333,427 also show the said extremely disagreeable properties. The dyeing of these dyestuffs in a defined shade is furthermore rendered more difficult by the fact that the same are not fast to acids and alkalis before their metallisation so that often already acidic steam present in the room may suffice to cause a substantial change of shade of the nonmetallised dyeings. In contradistinction to these dyestuffs the new, metal-containing dyestuffs being which are still capable of being further metallised have the advantage that they are well fast to acids and alkalis. Furthermore they are distinguished by the fact that, on after-treatment with heavy metal salts, they cause on the fibres still only a very slight change of shade, which in some cases can no more be noticed, thus, of course, considerably facilitating the dyeing in a determined shade.

A further valuable property of the new dyestuffs consists in that they dye the cotton portions of mixed fabrics consisting of wool and cotton in very light-fast brown shades, whereas the animal portion of the fabrics is scarcely dyed. Because of this property and in view of the fact that these dyestuffs can still be after-treated with heavy metal salts and more particularly with copper or chrome salts, the same are also suitable, in combination with chromable dyestuffs, for the dyeing of the animal portion of a mixed fabric in order to produce dyeings on mixed fabrics from wool and cellulosic fibres which are fast to light and in the moist state. In this case it is advisable to add adjuvants to the dye-bath when using such mixed fabrics. As adjuvants may be used for instance sodium pyrophosphate and ammonium sulfate or the like.

The new dyestuffs of the present invention will be obtained by condensing azo dyestuffs obtainable from diazotised 4-nitro-4'-aminostilbene-2:2'-disulfonic acid or 4-nitro-4'-aminodibenzyl-2:2'-disulfonic acid and o-hydroxycarboxylic acids of the benzene series coupling in p-position to the hydroxyl group with an aminoazo compound of the formula

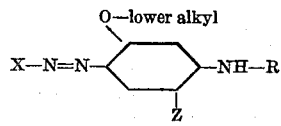

wherein
X means the radical of a diazotised o-aminophenol,
Z means hydrogen, a $CH_3$-, $OCH_3$- or $OC_2H_5$- group,
R means hydrogen, an acyl or a substituted or unsubstituted alkyl radical, or with the copper complex compound of an aminoazo compound of the above formula, the condensation being carried out in a caustic solution.

By the term "radical of a diazotised o-aminophenol" may be understood such phenyl radicals which in o-position to the azo group contain a free hydroxyl group and which otherwise can be substituted with further substituents usual for azo dyestuffs, such as halogen, alkyl, nitro, sulfonic acid, sulfonic acid amide, carboxylic groups and the like. The substituents R of the amino group falling within the scope of the definition given in this specification and in the claims may be selected from radicals which are split off, when carrying out the condensation reaction in a caustic solution, such for example as acyl groups, like the acetyl or benzoyl group, alkyl groups, like the methyl, ethyl, propyl, butyl group, etc., also substituted alkyl groups, such as the oxethyl group, carboxymethyl group, sulfomethyl group and so on.

For the production of the aminoazo compound corresponding to the above formula the following diazo components are particularly suitable: 2-amino-1-hydroxybenzene-4-sulfonic acid, 2-amino-1-hydroxybenzene-4-sulfamide, 4-chloro-2-amino-1-hydroxybenzene-6-sulfonic acid, 6-chloro-2-amino-1-hydroxybenzene-4-sulfonic acid, 4-chloro-2-amino-1-hydroxybenzene-5-sulfonic acid, 6-nitro-2-amino-1-hydroxybenzene-4-sulfonic acid, 3-amino-4-hydroxybenzoic acid, 2-hydroxy-3-amino-5-sulfobenzoic acid, 4-chloro-2-aminophenol, 4-nitro-2-aminophenol.

As coupling components use may be made of the m-alkoxy anilines which are capable of coupling in p-position to the amino group. As stated above, the amino group present in the coupling components can be substituted by alkyl radicals, such as methyl, ethyl, carboxymethyl and especially sulfomethyl groups, which under the conditions prevailing during the condensation in a caustic solution will be split off. Because of their easy availability and of low costs we prefer to use the primary m-alkoxy anilines which are capable of coupling in p-position to the amino group. Among such compounds m-anisidine, 1-amino-2-methyl-5-methoxybenzene, 2:5-dimethoxyaniline are particularly suitable. Indeed also acylated aminoazo compounds of the above formula can be used such for instance as the acetyl compounds or the benzoyl compounds.

As components for the coupling with diazotised 4-nitro-4'-aminostilbene-2:2'-disulfonic acid or 4-nitro-4'-aminodibenzyl-2:2'-disulfonic acid or the o-hydroxycarboxylic acids of the benzene series coupling in p-position to the hydroxyl group are particularly valuable; examples of such compounds are the salicylic, o-cresotic and m-cresotic acids.

The condensation of the nitrostilbene or nitrodibenzyl azo dyestuff with the aminoazo compound is carried out according to methods usual for the production of stilbene dyestuffs in the presence of caustic alkalis in an open vessel under reflux or, if desired, in a closed vessel under pressure. The condensation products can be after-treated with oxidising agents, if this is desired.

The resulting dyestuffs can be metallised in substance or on the fibres. As the same contain two atom groupings capable of forming metal complexes, they are capable of forming metal complexes containing one as well as two metal atoms per each dyestuff molecule. It has been found that metal complex compounds containing only one metal atom per each molecule can be prepared for instance by condensing metal complexes, for example the copper complex compounds of the aminoazo dyestuffs used according to the present invention, with nitrostilbene azo dyestuffs. On the other hand it is also possible to convert the finished condensation products into such metal complexes by treating the former with the theoretically required quantity of a metal salt, for instance a copper salt, so that only one metal atom will be introduced, which metal complexes are capable of taking up a further metal atom. The introduction of only one metal atom is preferably carried out in an acidic solution. The dyestuffs which thus are only partly metallised possess the valuable properties that they can once more be after-treated on the fibres with the same or with another metal salt, for instance with a chromium salt, whereby an improvement of the washing fastness and especially of a water fastness will be secured.

The new dyestuffs are dark powders producing, in form of copper complexes or after coppering, on the cellulosic fibre yellow brown, red brown, grey brown to dark brown dyeings of very good fastness properties and particularly of an excellent light-fastness.

In U. S. Patent 2,056,539 dyestuffs are disclosed which correspond to the following formula

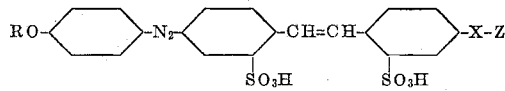

In this formula R means an alkyl radical, X means an azo or azoxy group and Z represents the radical of an amine or of a non-metallisable aminoazo dyestuff. These dyestuffs produce preponderantly orange shades, while their affinity to the fibre and more particularly their fastness properties in the moist state, especially the water-fastness properties are largely inferior to those of the new dyestuffs of the present invention after-treated with metal salts. In U. S. Patents 2,276,202 and 2,333,427 dyestuffs are described which differ from the dyestuffs claimed in the present patent application in that the same contain, instead of a monoazo dyestuff from diazotised 4-nitro-4'-aminostilbene-2:2'-disulfonic acid and an o-hydroxycarboxylic acid of the benzene series, 4:4'-dinitrostilbenedisulfonic acid or 4:4'-dinitrodibenzyl disulfonic acid as condensation component containing nitro groups. When compared with these dyestuffs the new dyestuffs are distinguished by the fact that their metal compound can once more be after-treated on the fibre with metal salts, preferably with chromium and copper salts, whereby an improvement of the fastness properties in the moist state will result. Surprisingly the new dyestuffs also possess partly considerably better affinity to fibres than the dyestuffs described in said U. S. Patents 2,276,202 and 2,333,427.

The following examples illustrate the invention without however limiting the same. Parts by weight bear the same relation to parts by volume as do grams to cubic centimeters.

*Example 1*

A mixture of 57.1 parts of the dyestuff prepared by coupling in the usual manner 4-nitro-4'-aminostilbene-2:2'-disulfonic acid with salicylic acid and of the dyestuff prepared in the usual manner by coupling 18.9 parts of 2-amino-1-hydroxybenzene-4-sulfonic acid with 15.3 parts of 2:5-dimethoxyaniline is condensed at boiling temperature and under reflux for 12–14 hours with 500 parts of water and 60 parts of caustic soda lye of 36° Bé., then, after cooling the mixture is neutralised by means of hydrochloric acid, completely precipitated with sodium chloride and filtered off.

The copper compound of the dyestuff is obtained, for instance, by dissolving the above dyestuff in 2200 parts of water, then treated with 14 parts of crystallised sodium acetate and with a solution of 25 parts of crystallised copper sulfate in 100 parts of water and stirring the whole for 10–12 hours at 80°–90° C. The copper compound is finally precipitated by means of sodium chloride and filtered off.

The dried metallised dyestuff constitutes a black powder which dissolves in water with a red-brown coloration and in concentrated sulfuric acid with a violet coloration; it dyes cellulosic fibres in light-fast bronze shades. When after-treated with copper salts, the dyeings become somewhat browner and faster to light, while the fastness properties to water and washing are also improved. By an after-treatment with chromium salts the fastness properties to water and washing are strongly increased.

Dyestuffs of similar properties are obtained when in the above example, instead of the aminoazo compound from diazotised 2-amino-1-hydroxybenzene-4-sulfonic acid and 2:5-dimethoxyaniline, 38 parts of the monoazo dyestuff 2-amino-1-hydroxybenzene - 4 - sulfonic acid→2:5-diethoxyaniline are used, or 33.7 parts of the monoazo dyestuff 2-amino-1-hydroxybenzene-4-sulfonic acid→1-amino-2-methyl - 5 - methoxybenzene, or 31.7 parts of the monoazo dyestuff 2-amino-1-hydroxybenzene-4-carboxylic acid→2:5-dimethoxyaniline, or 35.2 parts of the monoazo dyestuff 2-amino-1-hydroxybenzene - 4 - sulfamide→2:5-dimethoxyaniline, or 38.0 parts of the monoazo dyestuff 2-amino-1-hydroxybenzene-4-sulfamide→2:5-diethoxyaniline, or 33.6 parts of the monoazo dyestuff 2-amino-1-hydroxybenzene-4-sulfamide→1-amino-2-methyl - 5 - methoxybenzene, or 36.7 parts of the monoazo dyestuff 4-methyl - 2 - amino-1-hydroxybenzene-6-sulfonic acid→2:5-dimethoxybenzene, or 39.5 parts of the monoazo dyestuff 4-methyl-2-amino-1-hydroxybenzene-6-sulfonic acid→2:5-diethoxybenzene. The monoazo dyestuffs containing 1-amino-2-methyl-5-methoxybenzene yield condensation products which dye cellulosic fibres in somewhat yellower shades when coppered.

*Example 2*

57.1 parts of the dyestuff obtained from diazotised 4-nitro-4'-aminostilbene - 2:2' - disulfonic acid and salicylic acid and 32.3 parts of the dyestuff obtainable from diazotised 2-amino-1-hydroxybenzene-4-sulfonic acid and m-anisidine are heated to boiling under reflux for 12–14 hours with 500 parts of water and 100 parts of caustic soda lye of 36° Bé. and isolated in the usual manner.

For the manufacture of the copper compound the dyestuff is dissolved, for example, in 3000 parts of water, then treated, at a slightly Congo or acetic acid reaction, with 25 parts of crystallised copper sulfate in 100 parts of water and stirred at 80°–90° C. for 10–12 hours. The copper compound, which has precipitated for the greatest part, is finally completely precipitated by means of sodium chloride, filtered by suction and converted into the sodium salt.

The dried dyestuff is a black powder; it dissolves in water with a red-brown coloration and in concentrated sulfuric acid with a blue-violet coloration and dyes cellulosic fibres in very light-fast red-brown shades. By an after-treatment of the dyeings with copper salts the fastness properties to washing and water are still improved.

When using, instead of the above aminoazo dyestuff, 28 parts of the dyestuff 2-amino-1-hydroxybenzene - 4 - sulfamide→m-anisidine and preferably carrying out the condensation in a dilute solution, a dyestuff of similar properties will be obtained.

Somewhat more bluish brown shades will be produced with the aminoazo dyestuffs obtained by interaction of 36.8 parts of 4-nitro-2-amino-1-hydroxybenzene-6-sulfonic acid with m-anisidine or of 36.8 parts of 6-nitro-2-amino-1-hydroxybenzene-4-sulfonic acid with m-anisidine.

Instead of m-anisidine it is also possible to use 3-methoxy-1-ω-sulfomethylaminobenzene as coupling component; in this case the ω-sulfomethyl group can be split off before or during the condensation.

*Example 3*

57.1 parts of the dyestuff from diazotised 4-nitro-4'-aminostilbene-2:2'-disulfonic acid and salicylic acid and 35 parts of the copper compound of the amino azo dyestuff from diazotised 2-amino-1-hydroxybenzene-4-sulfonic acid and m-anisidine are heated to boiling under reflux for 6–8 hours in 900 parts of water and 100 parts of caustic soda lye of 36° Bé. and isolated in the usual manner.

The dried dyestuff constitutes a brown powder dissolving in water with a reddish-brown coloration and in concentrated sulfuric acid with a violet coloration; it dyes cellulosic fibres in light-fast yellow-brown shades. When after-treating the dyeings with copper salts, the same become improved with respect to their water-fastness.

*Example 4*

57.1 parts of the dyestuff obtainable from diazotised 4-nitro-4'-aminostilbene-2:2'-disulfonic acid and salicylic acid and 30 parts of the amino azo dyestuff obtainable from diazotised 6-chloro-2-amino-1-hydroxybenzene-4-sulfonic acid and m-anisidine are condensed in the usual manner for 12–14 hours with 500 parts of water and 60 parts of caustic soda lye of 36° Bé. and worked up.

If the dyestuff is converted into its copper compound at a Congo-acid reaction, as described in Example 2, a dyestuff is obtained which dissolves in water with a red-brown coloration and in concentrated sulfuric acid with a blue coloration and dyes cellulosic fibres in very light-fast brown shades. The water-fastness is substantially improved by an after-treatment of the dyeings.

Of course, the coppering can also be carried out by another known method, e. g. at an acetic acid or ammoniacal reaction.

*Example 5*

57.1 parts of the dyestuff from diazotised 4-nitro-4'-aminostilbene - 2:2' - disulfonic acid (or from an analogous dibenzyl compound) and salicylic acid and 25 parts of the dyestuff from diazotised 4-chloro-2-amino-1-hydroxybenzene and m-anisidine are condensed under reflux during 14–16 hours in 1000 parts of water and 300 parts of caustic soda lye of 36° Bé. and isolated in the usual manner.

The dyestuff thus obtained is dissolved in 4000–5000 parts of water and 150 parts of concentrated ammonia, treated with a solution of 25 parts of copper sulfate in 100 parts of water, stirred for 10–14 hours at 90°–95° C. and, as usual, isolated by precipitation by means of sodium chloride. A product which is somewhat easier soluble is obtained, when the coppering is carried out in the presence of a dispersing agent, such as for example 100 parts of a water-soluble casein decomposition product.

The dyestuff is an almost black powder; it dissolves in water with a red-brown coloration and in concentrated sulfuric acid with a blue coloration and dyes cellulosic fibres in light-fast brown shades.

Example 6

58.5 parts of the dyestuff obtainable from diazotised 4-nitro-4'-aminodibenzyl-2:2'-disulfonic acid and o-cresotic acid and 32 parts of the dyestuff from diazotised 2-amino-1-hydroxybenzene-4-sulfonic acid and 2:5-dimethoxyaniline are condensed in the usual manner with 900 parts of water and 100 parts of caustic soda lye of 36° Bé. The condensation product is converted in the usual manner into the copper compound.

The copper compound dissolves in water with a red-brown coloration and in concentrated sulfuric acid with a violet coloration and dyes cellulosic fibres in light-fast dark-brown shades. By an after-treatment with copper salts the dyeings are improved with regard to the fastness properties to washing and to water.

Example 7

A mixture of 57.1 parts of the dyestuff obtainable from diazotised 4-nitro-4'-aminostilbene-2:2'-disulfonic acid and salicylic acid and of 33.7 parts of the dyestuff obtainable from diazotised 2-amino-1-hydroxybenzene-4-sulfonic acid and 3-methoxy-1-N-methylaminobenzene is condensed under reflux in 500 parts of water and 70 parts of sodium hydroxide solution of 36° Bé. for 10–12 hours. After cooling the condensation product is isolated in the usual way and converted into its copper compound.

The dried dyestuff is a dark powder dissolving in water with a brown coloration and producing on cellulosic fibres light-fast, red brown dyeings, whose fastness properties to washing and to water can be still improved by an after-treatment with copper or chromium salts.

When using, instead of the above amino azo dyestuff, 36.7 parts of the amino azo dyestuff obtainable from 2-amino-1-hydroxybenzene-4-sulfonic acid and 3-methoxy-1-N-oxethylaminobenzene or 37.9 parts of the aminoazo dyestuff obtainable from 2-amino-1-hydroxybenzene-4-sulfonic acid and 3-methoxy-1-N-carboxymethylaminobenzene, dyestuffs of similar fastness properties will be obtained.

Example 8

A mixture consisting of 36.5 parts of 2-hydroxy-5-sulfo-2'-methoxy-4'-acetylamino-1:1'-azobenzene and of 58.5 parts of the dyestuff made by coupling diazotised 4-nitro-4'-aminostilbene-2:2'-disulfonic acid with m-cresotic acid is heated to boiling under reflux for 10–14 hours in 600 parts of water and 120 parts of caustic soda lye of 36° Bé. The dyestuff is isolated in the usual manner and converted into its copper compound.

The dried, metallized dyestuff forms a dark powder which is soluble in water with a brown coloration and dyes cellulosic fibres in light-fast, brown shades, whose fastness properties in the moist state can be improved by an after-treatment with metal salts.

A similar dyestuff can be obtained, if the condensation is carried out under pressure at 110–115° C. while preferably shortening the condensation period.

A dyestuff possessing similar fastness properties can also be obtained by replacing the nitrostilbene dyestuff used in this example by 57.1 parts of the dyestuff made from 4-nitro-4'-aminostilbene disulfonic acid and salicylic acid or by 58.5 parts of the dyestuff obtainable by coupling 4-nitro-4'-aminostilbene disulfonic acid with o-cresotic acid.

What I claim is:

1. The new stilbene dyestuffs, being when metallised dark powders, soluble in water and dyeing cellulosic fibres from an aqueous bath in yellow-brown to dark-brown shades of excellent fastness properties, from the condensation with one molecular proportion of a monoazo dyestuff of the general formula

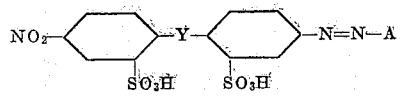

wherein Y means a divalent straight chain hydrocarbon radical containing 2 carbon atoms and A means a radical of an o-hydroxy-phenyl carboxylic acid coupling in p-position to the hydroxy group, and one molecular proportion of a monoazo dyestuff of the formula

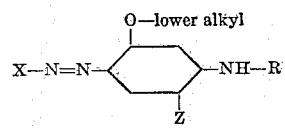

wherein X means an o-hydroxyphenyl radical, Z means a member selected from the group consisting of H, CH$_3$, OCH$_3$, and OC$_2$H$_5$, and R means a member selected from the group consisting of hydrogen, lower alkyl radicals and acyl radicals.

2. The new stilbene dyestuffs from the condensation with one molecular proportion of a monoazo dyestuff of the general formula

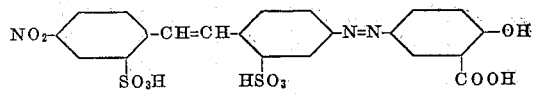

and one molecular proportion of a monoazo dyestuff of the formula

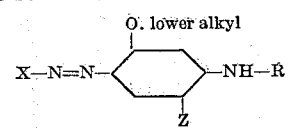

wherein X means an o-hydroxyphenyl radical, Z means a member selected from the group consisting of H, CH$_3$, OCH$_3$ and OC$_2$H$_5$, and R means a member selected from the group consisting of hydrogen, lower alkyl radicals and acyl radicals.

3. The new stilbene dyestuffs from the condensation with one molecular proportion of a monoazo dyestuff of the general formula

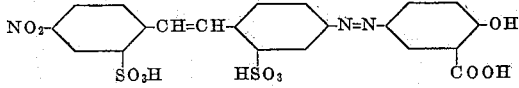

and one molecular proportion of a monoazo dyestuff of the formula

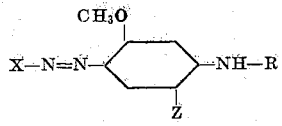

wherein X means an o-hydroxyphenyl radical, Z means a member selected from the groups consisting of H, CH$_3$, OCH$_3$ and OC$_2$H$_5$, and R means a member selected from the group consisting of hydrogen, lower alkyl radicals and acyl radicals.

4. The new stilbene dyestuff from the condensation with one molecular proportion of the monoazo dyestuff of the formula

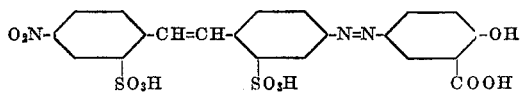

and one molecular proportion of

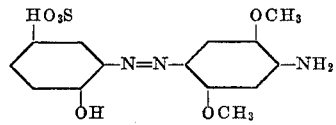

said dyestuff being, when coppered, a black powder, dissolving in water with red-brown coloration, in concentrated sulfuric acid with violet coloration and dyeing cellulosic fibres in light-fast bronze shades.

5. The new stilbene dyestuff from the condensation with one molecular proportion of the monoazo dyestuff of the formula

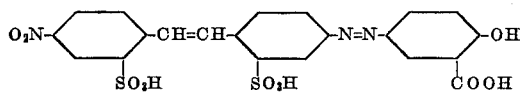

and one molecular proportion of

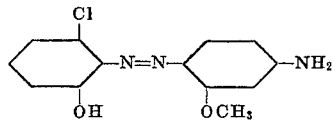

said dyestuff being in the form of the copper compound a nearly black powder, dissolving in water with red-brown coloration, in concentrated sulfuric acid with blue coloration and dyeing cellulosic fibres in light-fast brown shades.

6. The new stilbene dyestuff from the condensation with one molecular proportion of the monoazo dyestuff of the formula

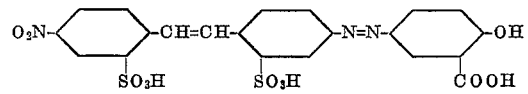

and a molecular proportion of

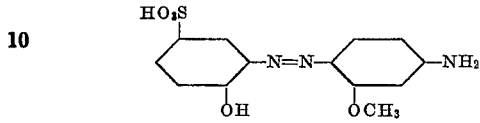

said dyestuff being in the form of the copper compound a black powder dissolving in water with red-brown coloration, in concentrated sulfuric acid with blue-violet coloration and dyeing cellulosic fibres in very light-fast red-brown shades of increased washing- and water-fastness, when after-treated with copper salts.

ERNST KELLER.

REFERENCES CITED

The following references are of record in the file of this patent:

UNITED STATES PATENTS

| Number | Name | Date |
|---|---|---|
| 1,861,323 | Schmid | May 31, 1932 |
| 1,861,324 | Schmid | May 31, 1932 |
| 2,004,250 | Schindhelm et al. | June 11, 1935 |
| 2,056,539 | Schindhelm et al. | Oct. 6, 1936 |
| 2,197,350 | Schindhelm et al. | Apr. 16, 1940 |
| 2,248,151 | Winkler et al. | July 8, 1941 |
| 2,276,202 | Keller | Mar. 10, 1942 |
| 2,314,023 | Straub et al. | Mar. 16, 1943 |
| 2,333,427 | Keller | Nov. 2, 1943 |

FOREIGN PATENTS

| Number | Country | Date |
|---|---|---|
| 145,884 | Switzerland | June 1, 1931 |
| 168,444 | Switzerland | June 16, 1934 |
| 178,947 | Switzerland | Oct. 16, 1935 |